(12) United States Patent
Matsuura (10) Patent No.: US 8,467,288 B2
(45) Date of Patent: Jun. 18, 2013

(54) METHOD OF PATH SWITCHING AND NODE APPARATUS

(75) Inventor: Masahiko Matsuura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 467 days.

(21) Appl. No.: 12/639,795

(22) Filed: Dec. 16, 2009

(65) Prior Publication Data

US 2010/0157813 A1 Jun. 24, 2010

(30) Foreign Application Priority Data

Dec. 19, 2008 (JP) ................................. 2008-324450

(51) Int. Cl.
*H04L 12/26* (2006.01)
(52) U.S. Cl.
USPC ........................... 370/219; 370/220; 370/242
(58) Field of Classification Search
None
See application file for complete search history.

(56) References Cited

U.S. PATENT DOCUMENTS

| 2003/0221018 | A1* | 11/2003 | Lee et al. | 709/249 |
|---|---|---|---|---|
| 2005/0128940 | A1* | 6/2005 | Wen et al. | 370/216 |
| 2006/0256712 | A1* | 11/2006 | Imajuku et al. | 370/218 |
| 2007/0036544 | A1* | 2/2007 | Fukashiro et al. | 398/19 |
| 2007/0280102 | A1* | 12/2007 | Vasseur et al. | 370/225 |
| 2009/0238196 | A1 | 9/2009 | Ukita et al. | |
| 2009/0245248 | A1* | 10/2009 | Arberg et al. | 370/390 |
| 2010/0080120 | A1* | 4/2010 | Bejerano et al. | 370/228 |

FOREIGN PATENT DOCUMENTS

| JP | 2002-64515 | 2/2002 |
|---|---|---|
| JP | 2007-36412 | 2/2007 |
| WO | WO 2007/066766 A1 | 6/2007 |

OTHER PUBLICATIONS

Office Action issued by the Japanese Patent Office on Aug. 28, 2012 in the corresponding Japanese patent application No. 2008-324450.

* cited by examiner

*Primary Examiner* — Min Jung
(74) *Attorney, Agent, or Firm* — Staas & Halsey LLP (57) ABSTRACT

An intermediate node apparatus in a first path including a start node apparatus, an end node apparatus, intermediate node apparatuses, and links between these node apparatuses, including a failure notification message transmission unit transmitting a failure notification message to the start node apparatus, when it is detected that a level of deterioration in transmission quality of a link among the links included in the first path is equal to or higher than a first threshold, and backup path setting device that receives a path setting message for setting a second path from the start node and sets the second path.

6 Claims, 12 Drawing Sheets

METHOD OF PATH SWITCHING AND NODE APPARATUS

CROSS-REFERENCE TO RELATED APPLICATION(S)

This application is based upon and claims the benefit of priority of the prior Japanese Patent Application No. 2008-324450, filed on Dec. 19, 2008, the entire contents of which are incorporated herein by reference.

FIELD

The embodiments discussed herein are related to a method and an apparatus for switching a currently used path to a backup path in a network including a plurality of node apparatuses and links between nodes when a failure occurs in one of the links included in the currently used path from the start node apparatus of the path to the end node apparatus of the path.

BACKGROUND

Recently, multi-protocol label switching (MPLS) has been used, which allows for the operation of a network by introducing the concept of label switching into an internet protocol (IP) network.

In addition, generalized multi-protocol label switching (GMPLS) is known as a technique for automatically operating distributed path networks including not only IP networks but also time division multiplexing switching (TDM) networks, such as synchronous digital hierarchy (SDH) and asynchronous optical network (SONET), and wavelength switching networks. The standardization of GMPLS is underway through discussions by Common Control and Measurement Plane Working Group (CCAMP-WG) of Internet Engineering Task Force (IETF), Optical Internetworking Forum (OIF), and International Telecommunication Union (ITU). This GMPLS has been partially put to practical use.

GMPLS realizes the standardization of the configuration of paths among different apparatuses, a bandwidth on demand (BoD) service allowing high-speed path configuration, an efficient network operation based on consolidated management of a plurality of layers, and the like.

In GMPLS, an MPLS header is given to an IP packet. This IP packet is transported through a network on the basis of the label within the MPLS header. This transporting mechanism is called label switching.

For setting paths in GMPLS, nodes cooperate with each other in the setting/releasing of paths, the setting of state information, and the like in accordance with a resource reservation protocol (RSVP). The content of the major messages exchanged using the RSVP protocol includes the following.

A Path message, propagated from upstream nodes to downstream nodes, is used to set or release paths and as a trigger for various settings.

A Resv message, propagated from downstream nodes to upstream nodes, is used to reserve a bandwidth and to respond to various settings.

A PathErr message, propagated from downstream nodes to upstream nodes, is used as an error response to a Path message.

A PathTear message, propagated from upstream nodes to downstream nodes, is used as a trigger for forced releasing of a path.

A Notify message, transmitted from a certain node to any other node, is used for notification of error information, point-to-point transmission of information, and the like.

By using these messages, the RSVP protocol allows exchanging of information among respective nodes on a point-to-point basis or using a hop-by-hop method, thereby allowing the management of paths.

Figure 1:
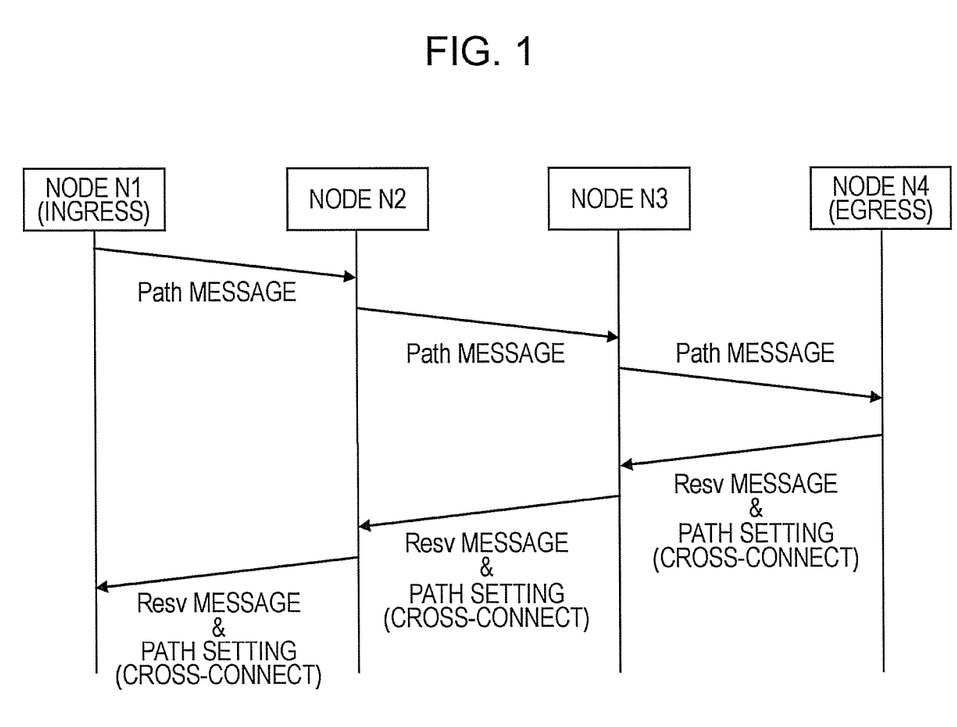
FIG. 1 illustrates a sequence of steps of performing path creation.

FIG. 1 illustrates a sequence of steps for performing path creation (signaling) with a hop-by-hop method from a start node N1 to an end node N4, using a Path message and a Resv message of the RSVP protocol.

Referring to FIG. 1, the start node (ingress node) N1 transmits to the neighboring intermediate node N2, using a monitor line (not illustrated), a Path message including information (Explicit_Route Object: ERO) about the path from the node N1 to the node N4 and a path number (timeslot number in TDM and wavelength number in WDM) to be used between the node N1 and the node N2.

At the node N2, when a resource corresponding to the path number specified by the received Path message is not in use (valid message), the resource corresponding to the path number is entered into a reserved state. Then the node N2 transfers the same Path message to the next intermediate node N3. The node N3, by performing processing similarly to the node N2, transfers the Path message to the end node (egress node) N4.

At the node N4, when the received Path message is valid, a Resv message showing a response of "OK" is transmitted via the monitor line, and path setting at the own node (i.e., cross-connect setting of the own node) is performed.

At the node N3, which has received the Rsev message from the node N4, an Resv message is transmitted to the node N2 and path setting at the own node (i.e., cross-connect setting of the own node) is performed similarly to the above. Similar processing is performed also at the nodes N2 and N1 to complete the path setting. Note that Resv message transmission is not performed at the node N1.

Nodes on a path that have been established by using GMPLS continue to monitor the connection state of the path by periodically transmitting a Path message and a Resv message. These two messages are called Refresh messages. If a Refresh message is not received due to some reason at a certain node, this node recognizes that the corresponding path has been disconnected.

In this case at the start node N1 in GMPLS, there exists a method of partially creating a backup link in such a manner as to avoid a failed portion on the basis of information of a path disconnection notification (RFC4873: segment recovery method).

Regarding this method, only steps of creating a partial backup link have been specified. A method for detection or notification of a failure, and management of the received notification about failure information vary, depending on the implementation of respective communications apparatus manufactures.

When communication is disconnected due to generation of a failure in optical signals, loss of signal (LOS) is detected. In this case, IP packets to be transmitted/received using an optical signal of the disconnected communication are of course not transmitted/received.

In SONET, the number of bit errors per SONET frame is counted. Bit errors themselves do not directly result in the disconnection of communication, and may be often relieved by means of application level retransmission at an upper layer or an error correction mechanism. The error rate for general communication lines is specified to be $10^{-6}$ (one error per million bits) or lower. However, the error rate is actually much lower than this, and is about $10^{-8}$ (one error per 100 million bits) or lower.

Note that Japanese Laid-open Patent Publication No. 2007-36412 discloses the following technique. That is, the normality of respective links and nodes constituting a backup path is monitored. When the backup path becomes unusable, one of the two end nodes of a segment of the backup path is changed to a node on the currently used path, thereby setting a different backup path.

SUMMARY

An intermediate node apparatus in a first path including a start node apparatus, an and node apparatus, intermediate node apparatuses, and links between these node apparatuses, including a failure notification message transmission unit transmitting a failure notification message to the start node apparatus, when it is detected that a level of deterioration in transmission quality of a link among the links included in the first path is equal to or higher than a first threshold, and backup path setting device that receives a path setting message for setting a second path from the start node and sets the second path.

The object and advantages of the various embodiments will be realized and attained by means of the elements and combinations particularly pointed out in the claims.

It is to be understood that both the foregoing general description and the following detailed description are exemplary and explanatory and are not restrictive of the various embodiments, as claimed.

DESCRIPTION OF EMBODIMENT

When a path automatically created by GMPLS fails, nodes associated with this path re-compute a detour after the occurrence of the failure. When path setting is finished, a signal recovers by means of switching. A period of time required from the occurrence of a failure to the recovery of a signal may take tens of seconds or several minutes, depending on the scale of the network.

A method of reducing the time required for the recovery of a signal may be creating a backup path at the time of creating a normally used path and switching to the backup path when a failure occurs. Although this method allows the time required for the recovery of a signal to be reduced, additional bandwidth and resources of the network must be prepared for the backup path.

Another method may be to forecast locations of the possible occurrences of failures and to perform computation in advance for creation of backup paths, thereby reducing the time required for the recovery of a signal. This method may be unrealistic when dual or triple failures occur or when paths to be managed are large in number, because an enormous amount of processing is required for computing detours in advance. Moreover, since the time required for setting a path is not reduced, the time required for the recovery of a signal is not sufficiently reduced.

A method of switching paths disclosed hereinafter allows efficient utilization of network resources and a significant reduction in time during which communication is disconnected.

Hereinafter, embodiments are described with reference to the attached drawings.

Node Apparatus Configuration

Figure 2:
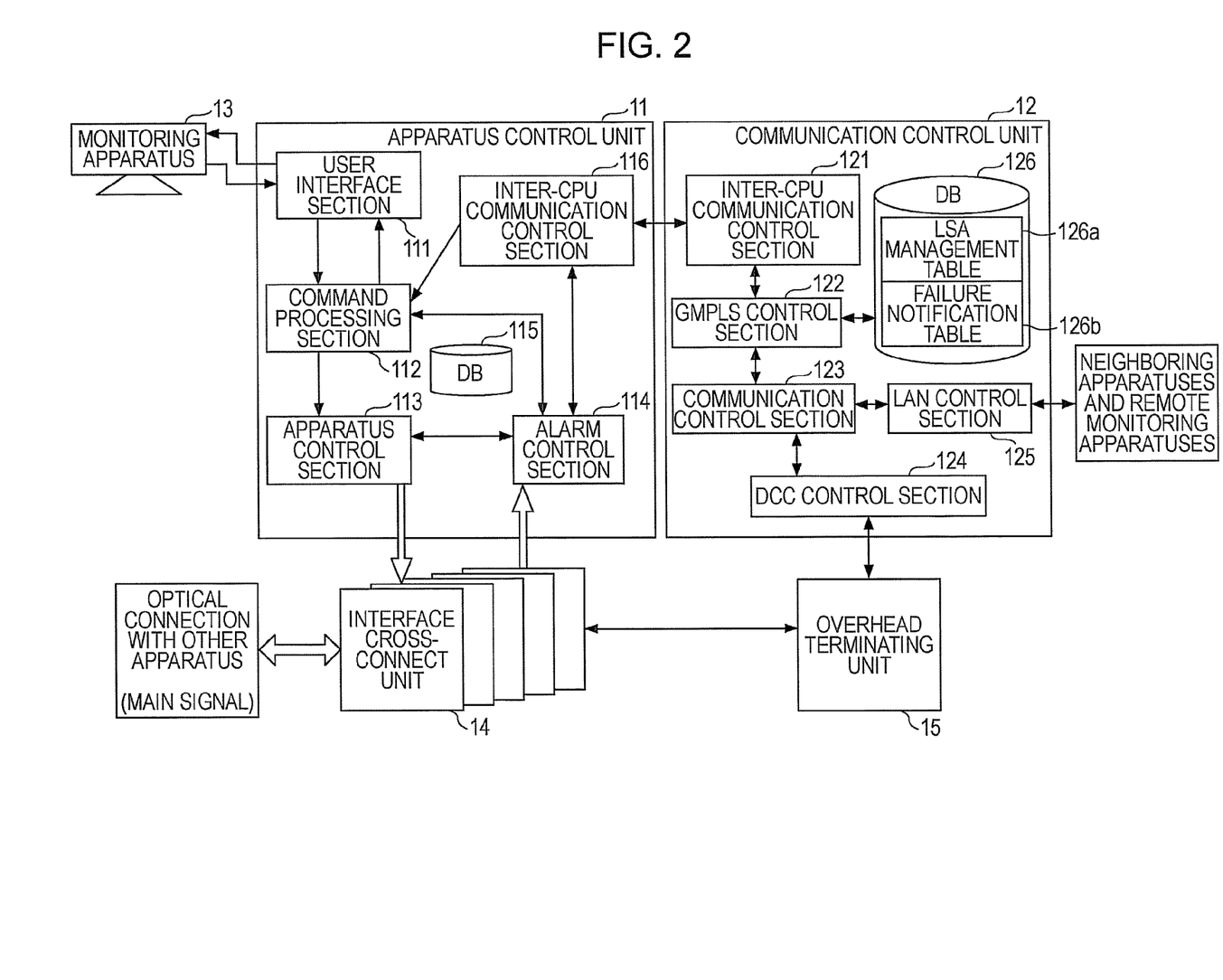
FIG. 2 is a configuration diagram of an embodiment of a node apparatus.

FIG. 2 is a configuration diagram of an embodiment of a node apparatus which is a component of a network system and performs path control processing in accordance with GMPLS. The node apparatus includes an apparatus control unit 11, a communication control unit 12, and a monitoring apparatus 13 connected to the apparatus control unit 11. The node apparatus also includes an interface cross-connect unit 14 connected to the apparatus control unit 11 and performing optical-electrical signal conversion and switching operations, an SDH/SONET overhead terminating unit 15 connected between the communication control unit 12 and the interface cross-connect unit 14.

The apparatus control unit 11 processes optical main signals, and the communication control unit 12 processes Path messages and Resv messages flowing through a monitor line.

The apparatus control unit 11 includes a user interface section 111 connected to the monitoring apparatus 13, a command processing section 112 connected to the user interface section 111, an apparatus control section 113 connected to the command processing section 112 and the interface cross-connect unit 14, and an alarm control section 114. The apparatus control unit 11 also includes a data base (DB) 115 storing path setting information and an inter-CPU communication control section 116 connected to the command processing section 112 and the alarm control section 114. The apparatus control section 113 and the alarm control section 114 are connected to each other.

A path setting command input from the monitoring apparatus 13 is provided to the user interface section 111, and the apparatus control section 113 sets paths for the cross-connect section of the interface cross-connect unit 14. The interface cross-connect unit 14 performs main signal communication with neighboring apparatuses. The interface cross-connect unit 14 also performs communication with the neighboring apparatuses using a data communication channel (DCC) of the overhead of the main signal to provide a monitor line function. The interface cross-connect unit 14 notifies the alarm control section 114 of a path alarm detected by the cross-connect section.

The communication control unit 12 includes an inter-CPU communication control section 121 connected to the inter-CPU communication control section 116 of the apparatus control unit 11 and a GMPLS control section 122 connected to this inter-CPU communication control section 121. The communication control unit 12 also includes a database (DB) 126 connected to the GMPLS control section 122. The DB 126 stores a link state advertisement (LSA) management table 126a that manages the topology of the network and a failure notification table 126b containing failure notification messages. Further, the communication control unit 12 includes a communication control section 123 connected to the GMPLS control section 122 and a data communication channel (DCC) control section 124 connected between the communication control section 123 and the overhead terminating unit 15. The DCC control section 124 performs transmission/reception of GMPLS control packets using DCC communication by controlling the DCC. The communication control unit 12 also includes a LAN control section 125 connected to the neighboring apparatuses and monitoring apparatuses. The LAN control section 125 performs transmission/reception of GMPLS control packets using LAN communication. Note that, in SONET, DCC communication is performed using bytes D1 to D3 of the section overhead (SOH) and bytes D4 to D12 of the line overhead (LOH).

In other words, the communication control unit 12 transmits/receives GPMLS packets using either DCC or LAN.

Creation of Backup Path

First, an operation of creating a backup path in response to bit errors will be described.

Figure 3:
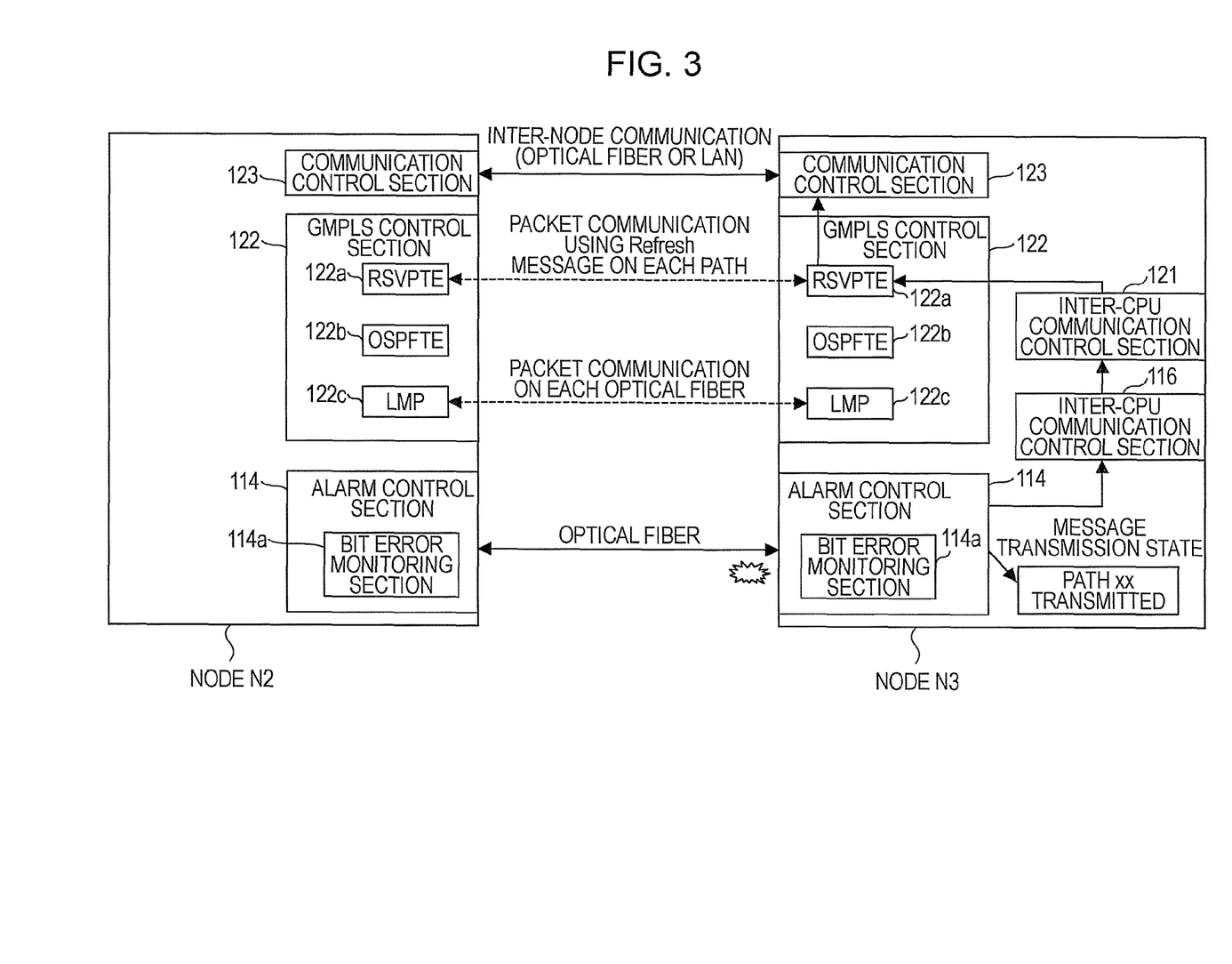
FIG. 3 illustrates how inter-node communication is performed when a B3 bit error has occurred.

FIG. 3 illustrates how inter-node communication is performed when B3 bit errors have occurred between the nodes N2 and N3, in a state where path setting using GMPLS has been completed.

Here, the GMPLS control section 122 includes a resource reservation protocol traffic engineering (RSVPTE) function section 122a, an open-shortest-path-first traffic (OSPFTE) function section 122b, and a link management protocol (LMP) function section 122c.

The RSVPTE function section 122a, having a signaling function, performs signaling for creating a path from a start node (ingress node) to an end node (egress node), and is in charge of exchanging messages. In addition, the RSVPTE function section 122a has a function of transmitting/receiving a Refresh message to manage the state of a path after the path has been established.

The OSPFTE function section 122b, which has a path control function, mainly advertises and obtains information about the network topology (network connection and formation). The OSPFTE function section 122b is also in charge of searching for a path from the start node to the end node. For instance, the OSPFTE function section 122b also searches for a path under the condition that a failed path is avoided.

The LMP function section 122c, which has a link management function, manages where each link (transmission line, i.e., optical fiber) between node apparatuses is connected to and the connection state of each link, and also detects path failure. This failure detection by the LMP function section 122c is always performed for each path, even when a path has not been established yet.

The RSVPTE function sections 122a of the nodes N2 and N3 monitor paths by transmitting/receiving a Refresh message (RefreshMsg) for each path and performing monitoring between the nodes N2 and N3.

The LMP function sections 122c transmit/receive messages through each optical fiber and monitor connection between the fibers. At this time, even if several bit errors have been observed by a bit error monitoring section 114a within the alarm control section 114, this has almost no influence on the actual packet communication. The reason for this is that even if several bit errors exist in the content of a communicated packet, error recovery is achieved by, for example, retransmission control performed at the upper layer. Hence, the RSVPTE function section 122a or the LMP function section 122c does not recognize any abnormalities during monitoring.

The bit error monitoring section 114a monitors a B3 error using a BIP-8 operation of B3 bytes in the path overhead (POH) of SONET (or SDH), to obtain information about deterioration in link transmission quality. When the B3 bit error rate exceeds the first threshold (for example, $10^{-8}$ or $10^{-6}$), the alarm control section 114 asks the RSVPTE function section 122a, via the inter-CPU communication control sections 116 and 121, to transmit a failure notification message (PathErr message or Notify message) to a start node (for example, the node N1). Then the alarm control section 114 sets the message transmission state to "transmitted". In FIG. 3, the RSVPTE function section 122a of the node N3 transmits the failure notification message.

Figure 4:
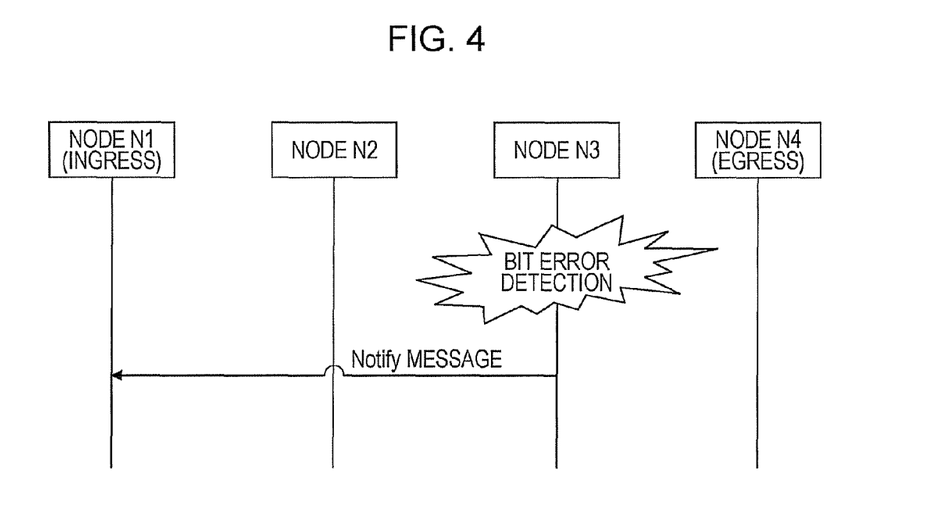
FIG. 4 illustrates how a Notify message is transmitted.
Figure 5:
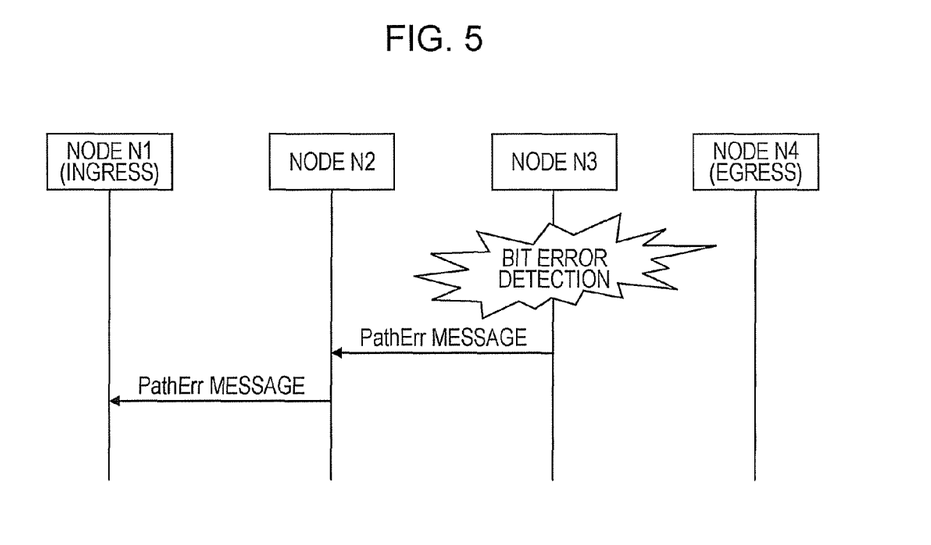
FIG. 5 illustrates how a PathErr message is transmitted.

Note that the Notify message may be transmitted from the node N3 directly to the addressed start (ingress) node N1 on a point-to-point basis, as illustrated in FIG. 4. On the other hand, the PathErr message is transmitted from the node N3 to the addressed start (ingress) node N1 sequentially through neighboring nodes using a hop-by-hop method, as illustrated in FIG. 5.

It is assumed that a Notify message is used in the present embodiment. The RSVPTE function section 122a transmits a failure notification Notify message to the start node via the communication control section 123 using LAN communication or DCC communication.

Figure 6:
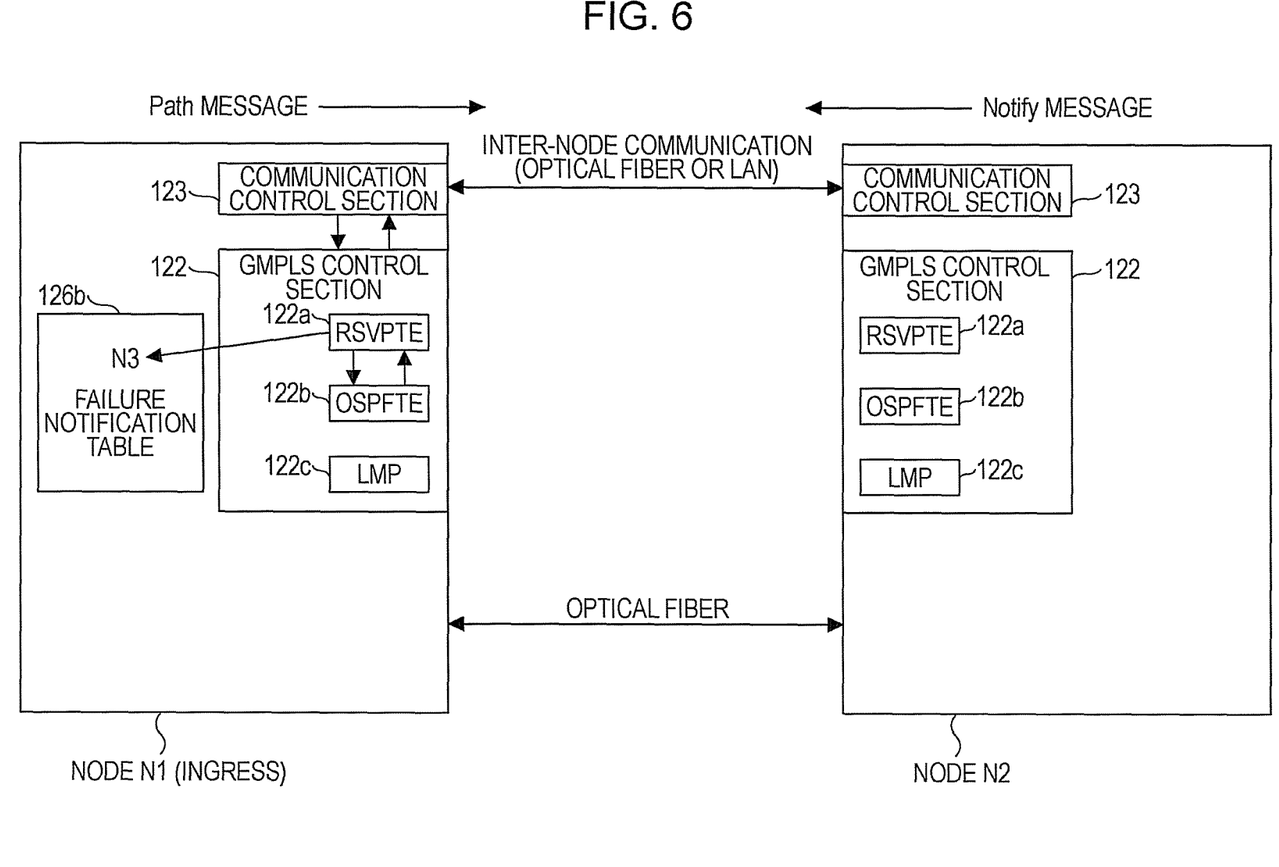
FIG. 6 illustrates the operation state of a start node N1 at the time of receiving a failure notification message.

FIG. 6 illustrates the operation state of the start node N1, which has received the failure notification message. The failure notification message received by the communication control section 123 in the Node N1 using LAN communication or DCC communication is provided to the RSVPTE function section 122a. The RSVPTE function section 122a stores the failure information of the failure notification message in the failure notification table 126b within the DB 126.

Then, the RSVPTE function section 122a asks the OSPFTE function section 122b to search for a backup path on the basis of the information in the LSA management table 126a and the failure notification table 126b. When the OSPFTE function section 122b finds a backup path, the RSVPTE function section 122a transmits a path creation Path message for creating the backup path to the downstream node N2 so as to make the message flow to nodes up to the end node. After that, the path is created in a sequence similar to that illustrated in FIG. 1.

Figure 7:
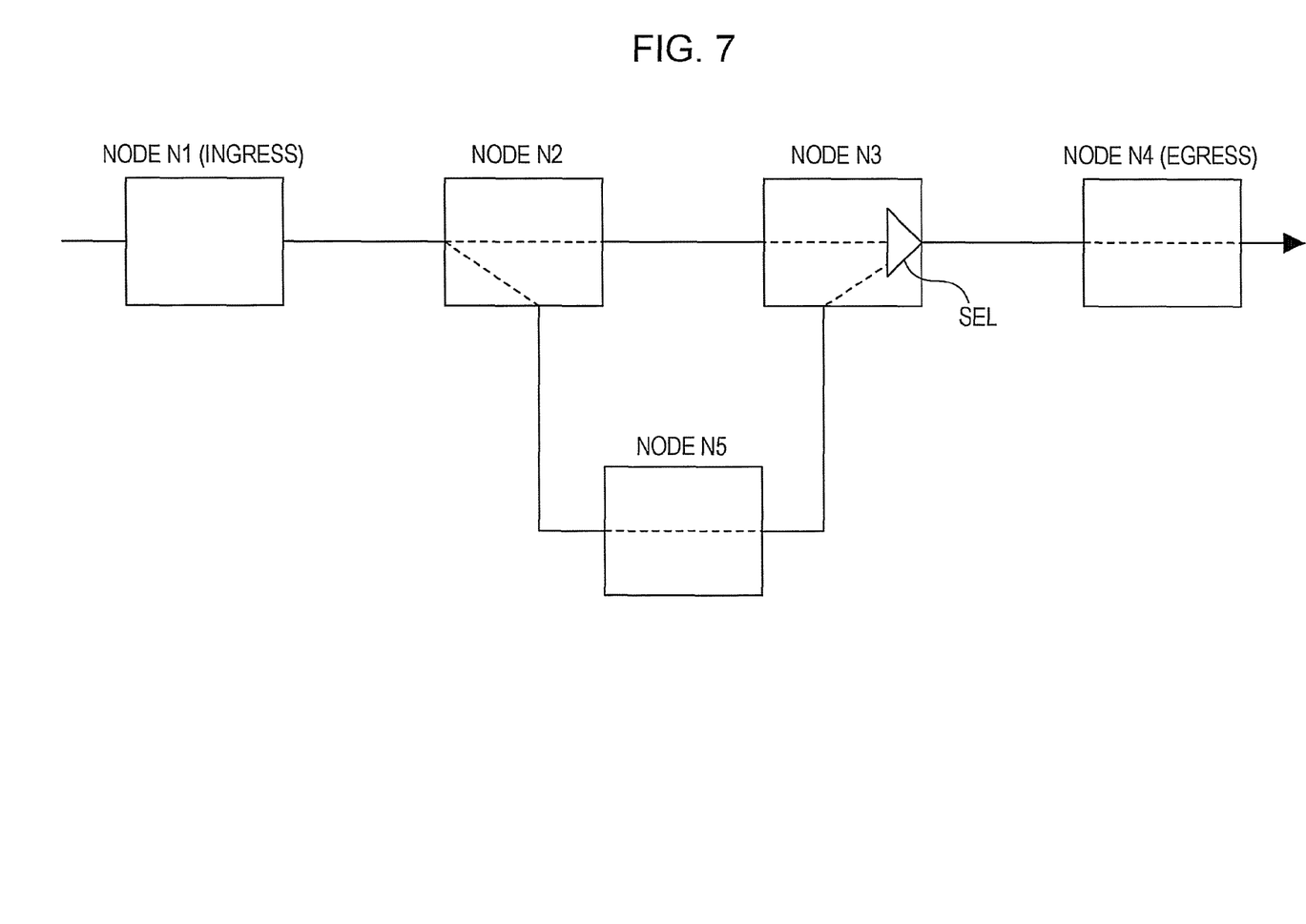
FIG. 7 illustrates a backup path.

FIG. 7 is an illustration for explaining a state after a backup path has been created. Here, a backup path from the node N2 to the node N3 via a node N5 has been created, since the B3 bit error rate between the nodes N2 and N3 has exceeded the first threshold (for example, $10^{-8}$).

When light has been completely cut off due to continuous generation of bit errors after the creation of the backup path, packet communication based on transmission/reception performed at the RSVPTE function section 122a and the LMP function section 122c is disconnected. The apparatus control section 113, which has received a signal disconnection notification from the RSVPTE function section 122a or the LMP function section 122c, performs switching so as to allow the signal to pass through the above-described backup path. In this case, the node N3 needs only to switch a selector from the node N2 side to the node N5 side, that is, 1+1 switching corresponding to selector switching, and hence, the switching can be performed at a high speed within, for example, 50 ms.

Note that the RSVPTE function section 122a and the LMP function section 122c of the node N3 detect the failure causing a trigger for the selector switching. Here, the node N3 transmits a failure notification message at the time when the B3 bit error rate has exceeded the first threshold. To prevent retransmission of the failure notification message, the RSVPTE function section 122a of the node N3 sets the message transmission state to "transmitted" and stores it in the DB 126, thereby preventing the retransmission of the failure message. The LMP function section 122c of the node N3 performs failure notification as usual and advertises a link (transmission line) failure over the entire network via the OSPFTE function section 122b.

Flowchart of Network Operation upon Detection of Failure

Figure 8:
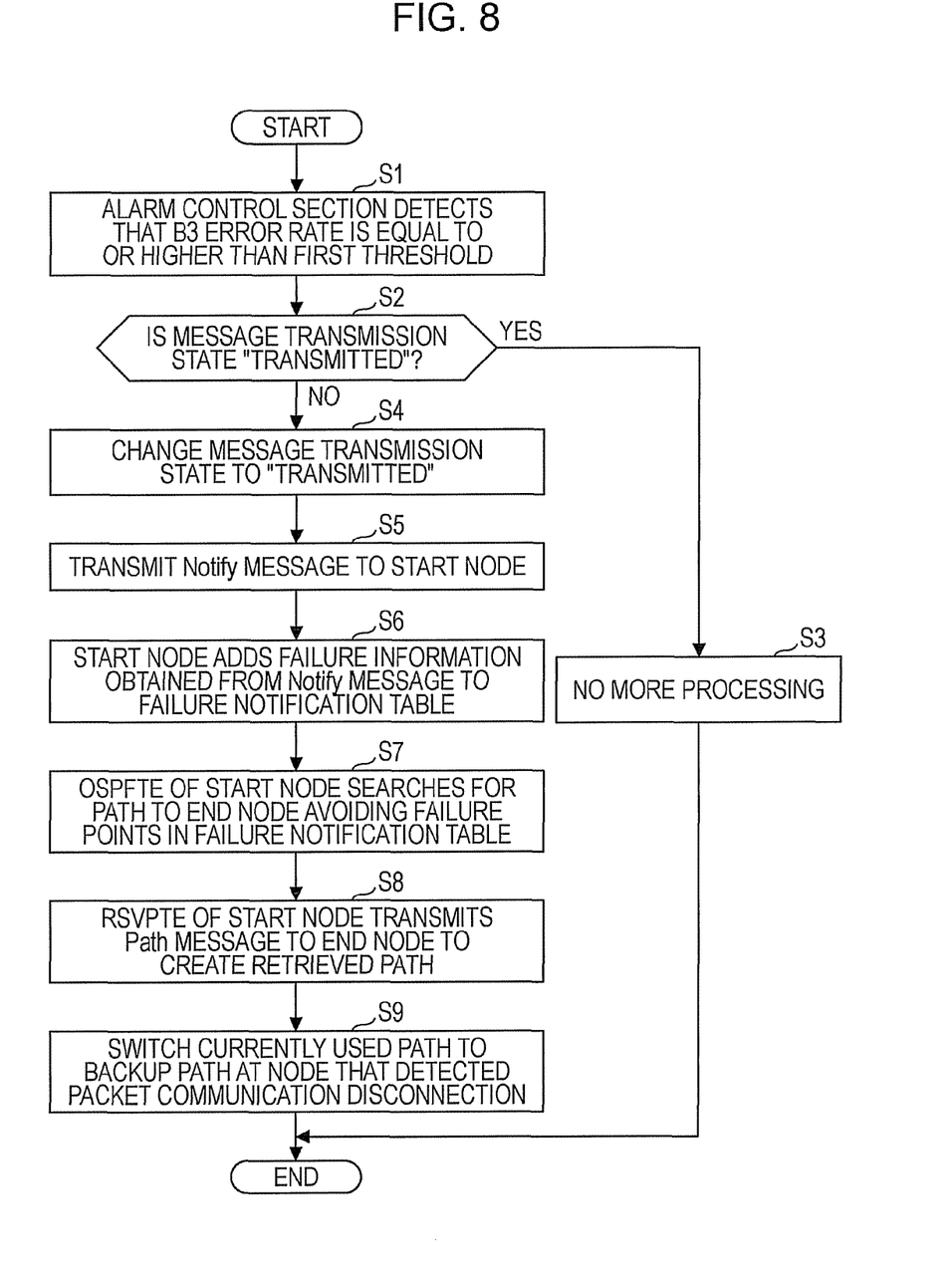
FIG. 8 is a flowchart of the operation of the entire network at the time of detection of a failure.

FIG. 8 illustrates a flowchart of the operation of the entire network upon detection of a failure. Referring to FIG. 8, when, for example, the alarm control section 114 of the node N3 detects that the B3 bit error rate is equal to or higher than the first threshold in step S1, the GMPLS control section 122 of the node N3 determines in step S2 whether or not the failure notification message transmission state of the DB 126 is "transmitted". When the transmission state is "transmitted", the processing for the time of failure detection ends in step S3 without processing.

On the other hand, when the transmission state is not "transmitted", the GMPLS control section 122 sets the failure notification message transmission state of the DB 126 to "transmitted" in step S4, and transmits a failure notification message from the communication control section 123 to the start node N1 in step 85.

In step S6, the start node N1, having received this failure notification message, stores failure information of the failure notification message received by the RSVPTE function section 122a in the failure notification table 126b.

In step S7, the OSPFTE function section 122b of the start node N1 searches for a backup path reaching the final node N4 avoiding the failed portion (the node that transmitted the failure notification message) with reference to the LSA management table 126a and the failure notification table 126b.

In step S8, the RSVPTE function section 122a of the start node N1 transmits a path setting Path message for setting the backup path shown in the notification from the OSPFTE function section 122b to the downstream node N2 so as to make the message flow to nodes up to the end node N4.

Then in step S9, the apparatus control sections 113 of the nodes N2 and N3, which have detected the disconnection of packet communication via the RSVPTE function sections 122a and the LMP function sections 122c, perform switching from the currently used path to the backup path.

Detection of Failures at Plurality of Locations

Also when bit errors are detected at two locations, each node that has detected a bit error transmits a failure notification message to the start node N1 similarly to the above description. This allows a plurality of failure notification messages to be stored in the failure notification table 126b, whereby the start node N1, by searching all the failure information stored in the failure notification table 126b for a backup path, can create a backup path avoiding the failure locations.

Figure 9:
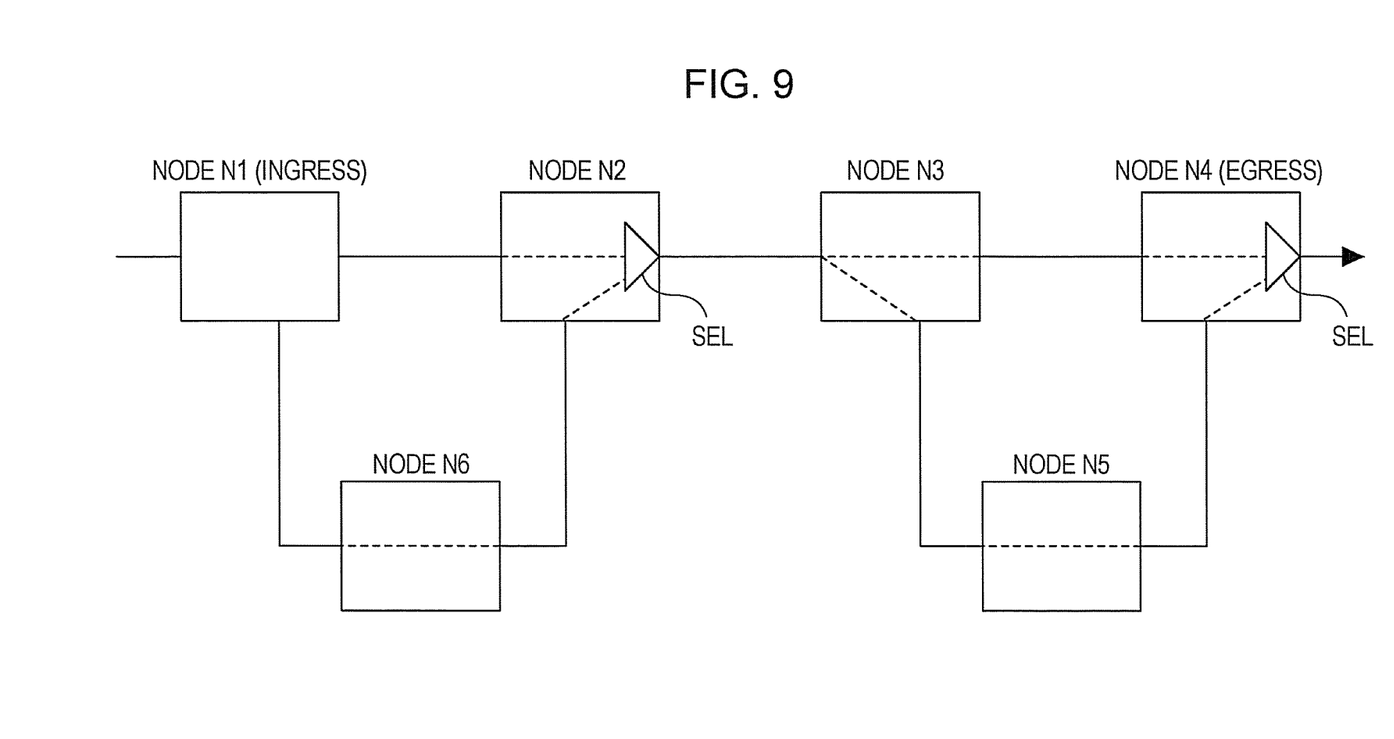
FIG. 9 illustrates a backup path at the time of detection of failures at a plurality of locations.

FIG. 9 illustrates a state in which a backup path constituted by nodes N1, N6, N2, N3, N5, and N4 has been created upon the occurrences of B3 errors with an error rate equal to or higher than the first threshold respectively between the nodes N1 and N2 and between the nodes N3 and N4.

Release of Backup Path

Figure 10:
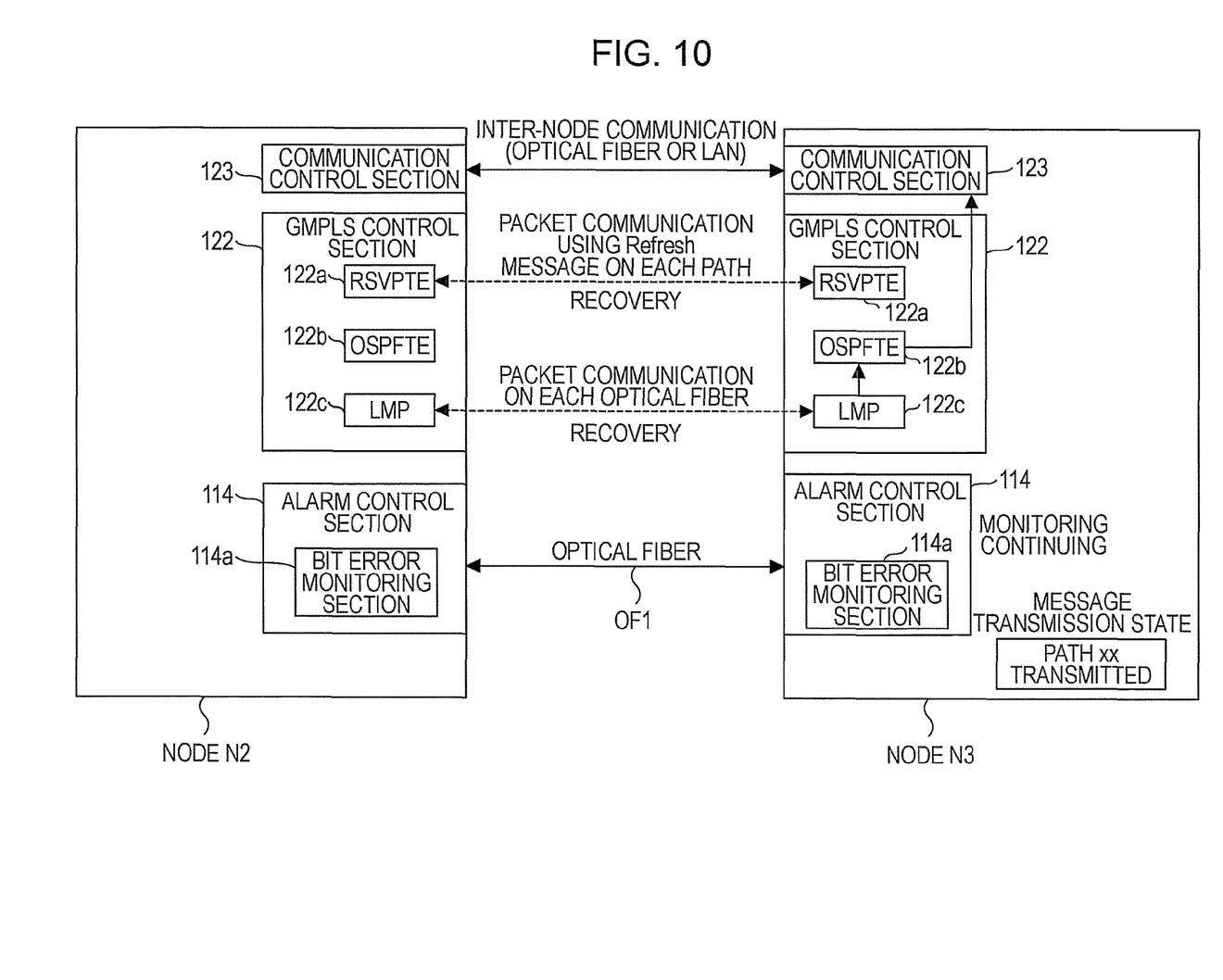
FIG. 10 illustrates how inter-node communication is performed when a backup path is released.

FIG. 10 illustrates how inter-node communication is performed when a backup path between the nodes N2 and N3 is released upon recovery from a failure.

Right after the recovery of an optical fiber OF1 between the nodes N2 and N3 from a failure, the respective bit error monitoring sections 114a within the alarm control sections 114 of the nodes N2 and N3 still continue to monitor bit errors periodically.

Upon recovery from the failure, the RSVPTE function sections 122a and the LMP function sections 122c of the nodes N2 and N3 respectively detect the recovery from the failure through the state change from a state in which packet communication has been disconnected to a state in which packet communication becomes possible. However, when the message transmission state stored in the DB 126 is "transmitted" and the failure notification message of the corresponding path has been transmitted, the RSVPTE function section 122a of the node N3 masks a recovery notification message of the RSVPTE function section 122a so as not to transmit the recovery notification message. At the time of recovery from the failure, the LMP function section 122c of the node N3 advertises the recovery state over the entire network via the OSPFTE function section 122b.

Figure 11:
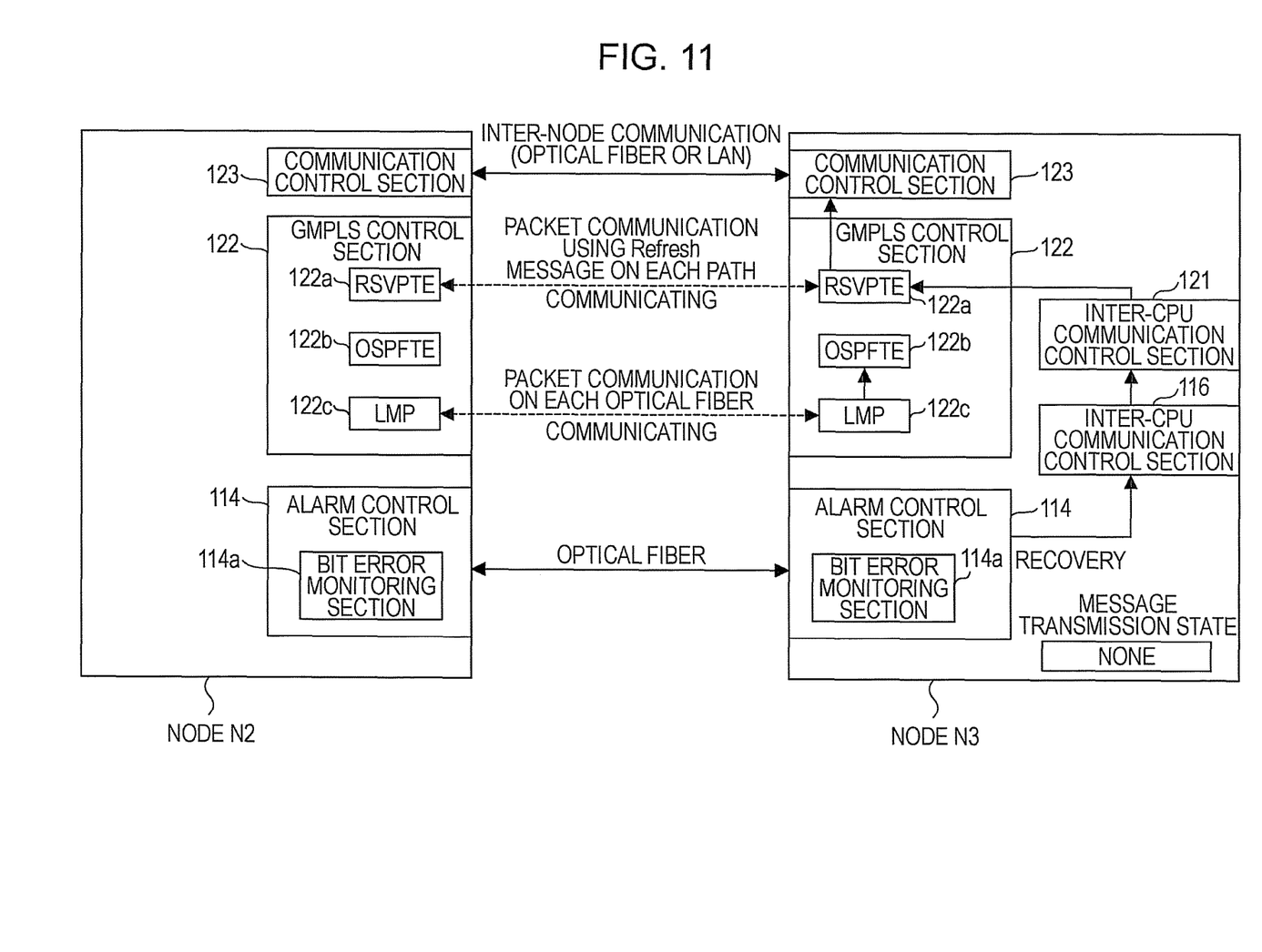
FIG. 11 illustrates the state of inter-node communication for transmitting a recovery notification.

FIG. 11 illustrates the state of inter-node communication in which the bit error monitoring section 114a transmits a recovery notification when the B3 bit error rate continues to be the second threshold or lower for a predetermined period of time.

The alarm control section 114 of the node N3 performs determination of recovery periodically. In other words, when the B3 bit error rate becomes equal to or lower than the second threshold (for example, $10^{-8}$ or $10^{-6}$), the alarm control section 114 determines whether or not the present apparatus has been in a state in which a bit error was detected (the failure notification message transmission state is "transmitted"). When the present apparatus has been in a state in which a bit error was detected (the failure notification message transmission state is "transmitted"), the alarm control section 114 changes the failure message transmission state stored in the DB 126 to "none", and asks the RSVPTE function section 122a to transmit a failure recovery message using a PathErr message or a Notify message.

Since the original path which was being used for communication has been switched to a backup path due to the occurrence of a failure, the alarm control section 114 asks the apparatus control unit 11 to switch back to the original path. The RSVPTE function section 122a transmits a recovery notification message to the start node N1 using LAN communication or DCC communication via the communication control section 123.

Figure 12:
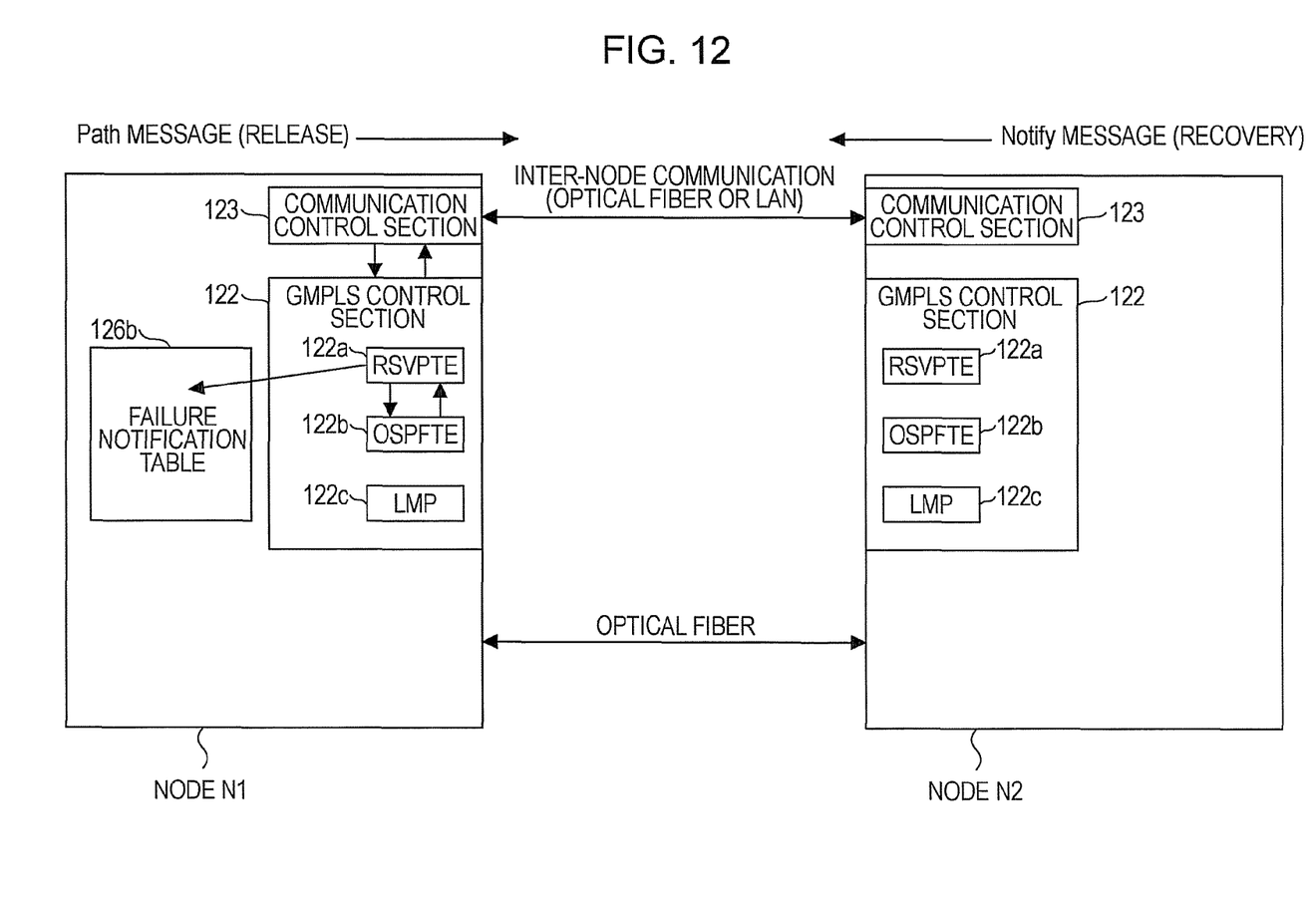
FIG. 12 illustrates the state of a start node having received a recovery notification message.

FIG. 12 illustrates the state of the start node N1 having received the recovery notification message. The recovery notification message received by the start node N1 using LAN communication or DCC communication is provided to the RSVPTE function section 122a of the start node N1, and the RSVPTE function section 122a removes the failure information corresponding to the recovery notification message from the failure notification table 126b.

After that, the RSVPTE function section 122a of the start node N1 transmits a path release Path message for releasing the backup path and switching to the originally used path, to the downstream node N2 so as to make the message flow to nodes up to the end node. Then the backup path is released and switched to the originally used path in a sequence similar to that illustrated in FIG. 1.

Flowchart of Operation upon Failure Recovery

Figure 13:
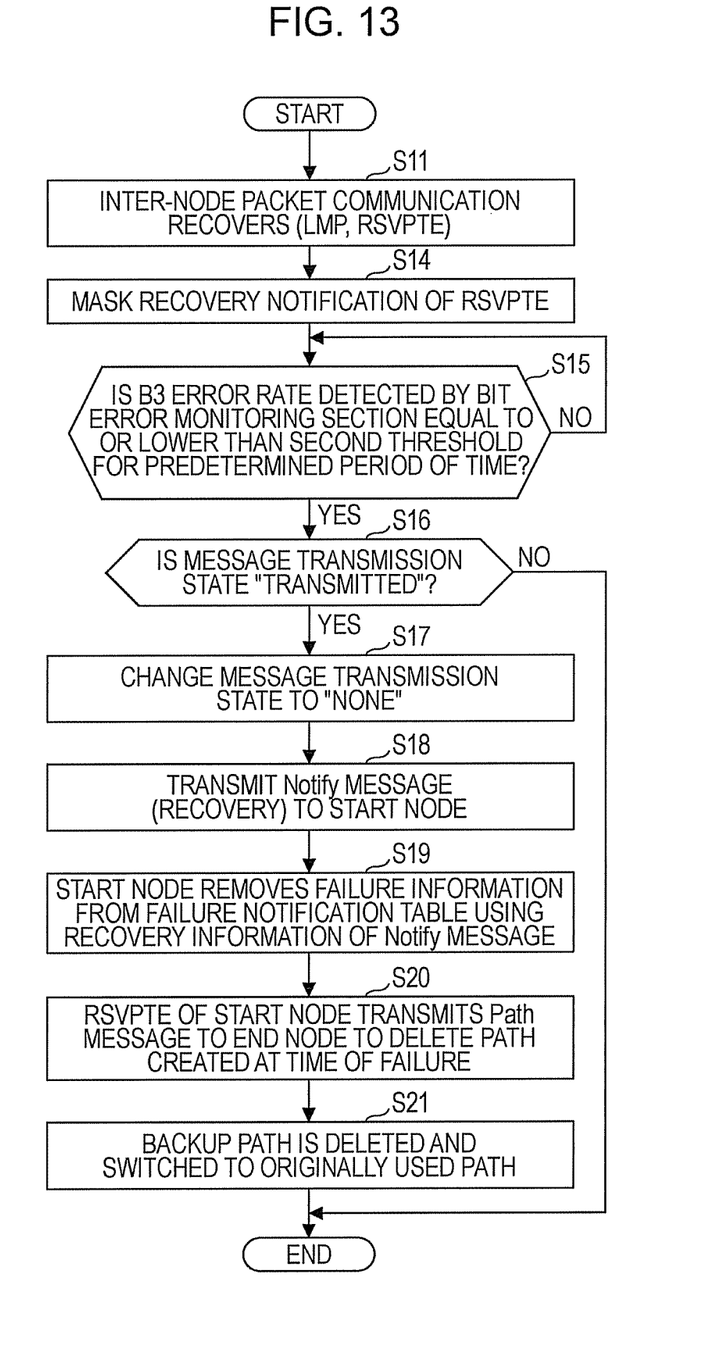
FIG. 13 is a flowchart of the entire network operation at the time of failure recovery.

FIG. 13 illustrates a flowchart of the entire network operation at the time of failure recovery. Referring to FIG. 13, in step S11, packet communication performed by the RSVPTE function section 122a and the LMP function section 122c between the nodes N2 and N3, which suffered from a failure, is recovered. Then in step S14, the RSVPTE function section 122a of the node N3, which has recovered from the failure, performs masking so as not to transmit a recovery notification message.

Then in step S15, the bit error monitoring section 114a of the node N3, when it detects that the B3 bit error rate has been equal to or lower than the second threshold for a predetermined period of time, proceeds to step S16. In step S16, the RSVPTE function section 122a of the node N3 determines whether or not the message transmission state of the corresponding path is "transmitted".

When the message transmission state is determined to be "none", this processing performed at the time of recovery from a failure ends. When the message transmission state is determined to be "transmitted", the GMPLS control section 122 of the node N3 changes the message transmission state to "none" in step S17, and in step S18, the communication control section 123 transmits a recovery notification Notify message to the start node N1.

In step S19, the start node N1 receives the recovery notification message. The RSVPTE function section 122a of the start node N1 removes the failure information from the failure notification table 126b.

In step S20, the OSPFTE function section 122b of the start node N1 transmits a path release Path message for releasing the backup path to the downstream node N2 so as to make the message flow to nodes up to the end node N4.

In step S21, the respective nodes N2, N3, N4, and N5, having received this path release message, release the backup path and switch back to the originally used path.

In the embodiment described above, since a backup path is not created in advance, the network resources are efficiently used, and a period of time during which communication is disconnected is significantly reduced. In addition, since a backup path is released when a transmission line recovers from a failure and the quality of the transmission line becomes stable, more efficient operation of the network resources is realized.

Note that the first and second thresholds may have the same value, or a hysteresis characteristic may be realized by making the second threshold, for example, $10^{-8}$ and the first threshold, for example, $10^{-6}$, which is larger than the second threshold.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A method of switching a path in a network system constituted by a plurality of node apparatuses and links connecting the apparatuses, the method comprising:

in a first path including a start node apparatus, an end node apparatus, intermediate node apparatuses, and links between these node apparatuses, transmitting a failure notification message to the start node apparatus from a node apparatus that detects that information about deterioration in transmission quality of a link among the links included in the first path indicates a value equal to or higher than a first threshold;

searching, by the start node apparatus, for a second path avoiding the link at which the deterioration in transmission quality has been detected based on the failure notification message;

creating, in the start node apparatus, a path setting message for setting the second path and transmitting the path setting message to each of the nodes of the second path up to the end node; and after setting the second path, transmitting, by the start node apparatus, an instruction to switch from the first path to the second path.

2. The method of switching a path according to claim 1, wherein, in a state in which the first path has been switched to the second path, a recovery notification message created in a node apparatus that detected recovery from the failure of the link is masked, wherein the node apparatus that detected the recovery from the failure, when detecting that the information about the deterioration in transmission quality of the link indicates a value equal to or lower than a second threshold, transmits a recovery notification message to the start node apparatus, wherein the start node apparatus, which has received the recovery notification message, creates a path release message for releasing the second path and transmits the path release message such that the path release message is transmitted to nodes up to the end node apparatus, and wherein the second path is released and switched to the first path in each node included in the second path.

3. An intermediate node apparatus in a first path including a start node apparatus, an end node apparatus, intermediate node apparatuses, and links between these node apparatuses, comprising:

a processor to manage each link associated with the intermediate node and detect path failures in each link associated with the intermediate node regardless of whether a path including the respective link has been established yet;

a transmitter to transmit a failure notification message to the start node apparatus when it is detected that a level of deterioration in transmission quality of a link associated with the intermediate apparatus among the links included in the first path is equal to or higher than a first threshold; and a receiver to receive a path setting message setting a second path from the start node, wherein the processor further sets the second path.

4. The node apparatus according to claim 3, wherein the processor further masks a recovery notification message, created in a state in which the first path has been switched to the second path, regarding the link at which the deterioration in transmission quality has been detected, and the transmitter further transmits the recovery notification message to the start node apparatus when it is detected that the level of deterioration in transmission quality is equal to or lower than a second threshold.

5. A start node apparatus in a first path including the start node apparatus, an end node apparatus, intermediate node apparatuses, and links between these node apparatuses, comprising:

a processor to search, in response to reception of a failure notification message transmitted from a node apparatus that detects that a level of deterioration in transmission quality of a link among the links included in the first path is equal to or higher than a first threshold, for a second path avoiding the link at which the deterioration in transmission quality has been detected; and a transmitter to transmit a path setting message for setting the retrieved second path such that the path setting message is transmitted to nodes up to the end node of the first path.

6. The node apparatus according to claim 5, the transmitter, upon receiving a recovery notification message from a node that detected that information about the deterioration in transmission quality of the link indicates a value equal to or lower than a second threshold, creates a path release message for releasing the second path and transmits the path release message such that the path release message is transmitted to nodes up to the end node apparatus.

* * * * *

UNITED STATES PATENT AND TRADEMARK OFFICE
CERTIFICATE OF CORRECTION

PATENT NO. : 8,467,288 B2
APPLICATION NO. : 12/639795
DATED : June 18, 2013
INVENTOR(S) : Masahiko Matsuura Page 1 of 1

It is certified that error appears in the above-identified patent and that said Letters Patent is hereby corrected as shown below:

In the Claims

Column 11, Line 5, In Claim 3, after "message" insert -- for --.

Signed and Sealed this
Twenty-fourth Day of September, 2013

Teresa Stanek Rea
*Deputy Director of the United States Patent and Trademark Office*